United States Patent

[11] 3,556,052

[72] Inventor Luther H. Blount
Poppasquash Road, Bristol, R.I. 02809
[21] Appl. No. 812,087
[22] Filed Apr. 1, 1969
[45] Patented Jan. 19, 1971

[54] METHOD AND MEANS FOR GROWING OYSTERS
15 Claims, 6 Drawing Figs.
[52] U.S. Cl. ..................................................... 119/4
[51] Int. Cl. ............................................... A01k 61/00
[50] Field of Search ......................................... 119/4

[56] References Cited
UNITED STATES PATENTS
| 1,815,521 | 7/1931 | Miyagi | 119/4 |
| 3,017,856 | 1/1962 | Munz | 119/4 |
| 3,294,062 | 12/1966 | Hanks | 119/4 |
| 3,316,881 | 5/1967 | Fischer | 119/4 |

Primary Examiner—Aldrich F. Medbery
Attorney—Max Schwartz

ABSTRACT: An oyster cultch made of plastic, stiff wire, or any other suitable material, in which crossed arms are provided which are coated with a material which repels the oyster spats. The outer ends of the arms are provided with members of any suitable shape on which the spats will adhere and grow. This member should be of a calcium carbonate concentrate or be coated therewith. The ends of the arms being spaced from each other, it provides room for optimum growth. The spider members with the crossed arms are strung on rigid wire strings in spaced relation, the spacing being provided by plastic tubing between the spiders. A rectangular float is used to suspend the strings. Each float comprises a frame with a 12 inch by 12 inch wire mesh. One string is suspended at each intersection. Room is thus provided for the optimum flow of water borne nutrients and for large even growth of the oysters. The spacing of the spiders and the strings insures that each oyster is in its own cube of space and that all the cubes of spaces are equal.

PATENTED JAN 19 1971　　　　　3,556,052
SHEET 1 OF 2
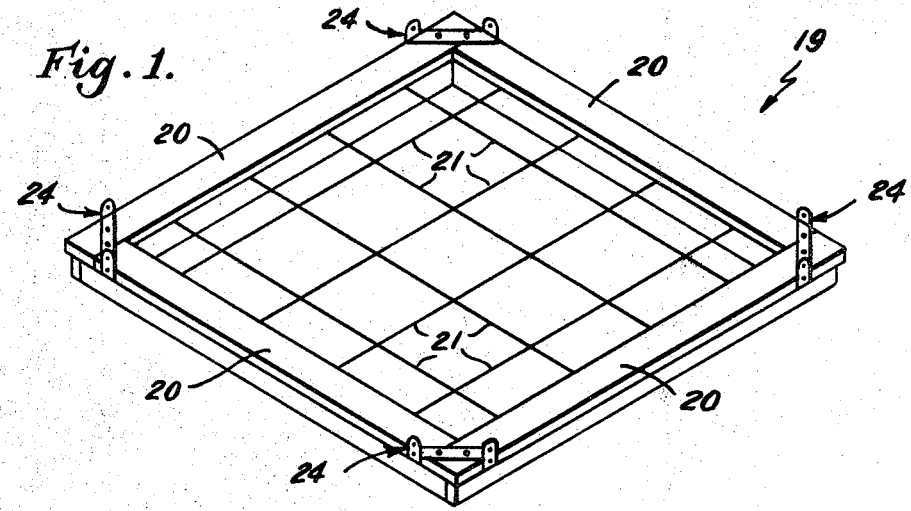
Fig. 1.
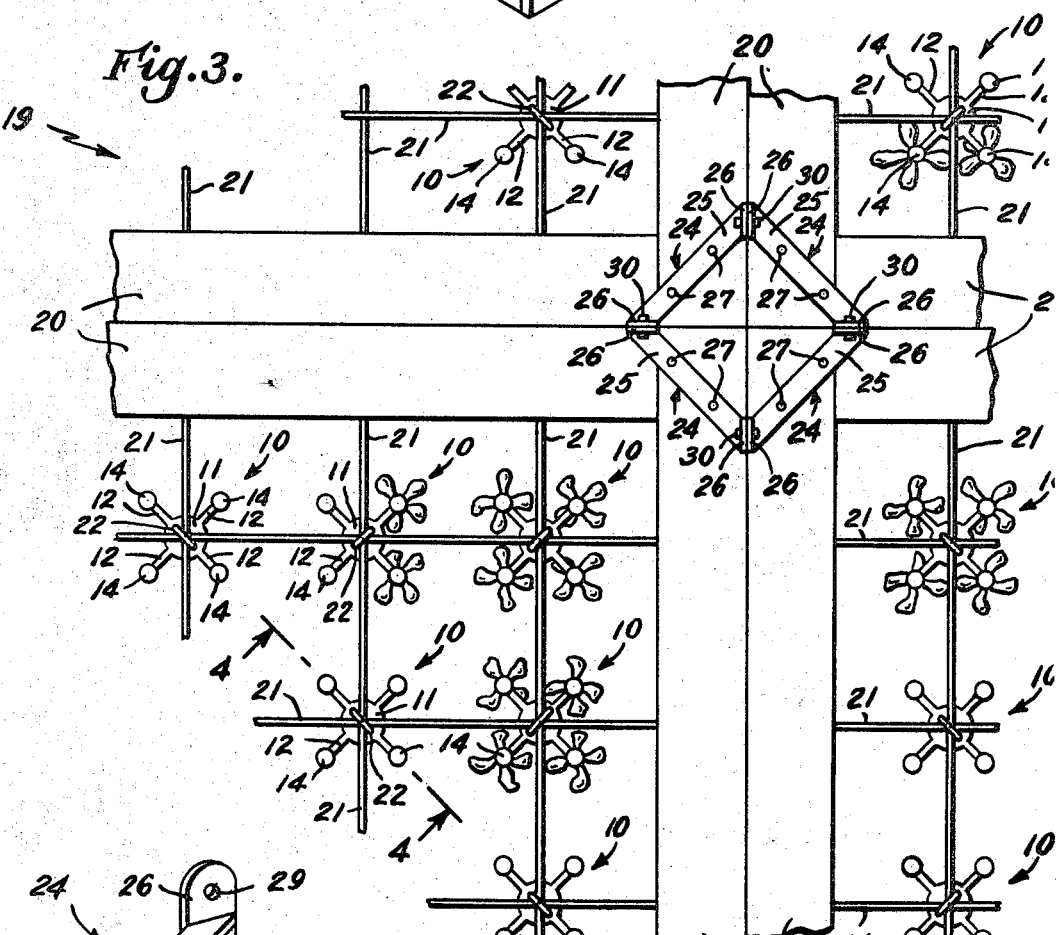
Fig. 3.
Fig. 2.
Inventor,
Luther H. Blount,
by [signature] Att'y.

PATENTED JAN 19 1971

Inventor,
Luther H. Blount,
by *[signature]* Att'y.

METHOD AND MEANS FOR GROWING OYSTERS

My present invention relates to the shellfish industry, and more particularly to a novel method and means for growing oysters.

The principal object of the present invention is to provide a means for growing oysters by the suspension method in which the individual oyster spats are arranged on a cultch approximately equidistant from each other, both vertically and horizontally, to provide an optimum flow of water borne nutrients.

Another object of the present invention is to provide a novel oyster spat holder and method of mounting which provides ample room for growth and rapid change of water.

A further object of the present invention is to provide a method and means for growing oysters which permits easy and rapid inspection and selective harvesting of the oysters.

Another object of the present invention is to provide a method and means for growing oysters which is simple in construction and easy and economical to manufacture, assemble and use.

With the above and other objects and advantageous features in view, my invention consists of a novel arrangement of parts and a novel method of operation more fully disclosed in the detailed description following, in conjunction with the accompanying drawings, and more particularly defined in the appended claims.

In the drawings:

FIG. 1 is a perspective view of a float for holding the strings of spats in accordance with the present invention;

FIG. 2 is a perspective view of one of the connectors for locking the floats together;

FIG. 3 is an enlarged fragmentary plan view showing the connection between a plurality of floats and the method of stringing;

In the growing of oysters, the spats are haphazardly caught on a suitable holder such as a scallop shell, and then deposited in a suitable oyster bed. Due to losses by predators, and the unsuitability of some muddy bottoms, it has been found that for better results the spat-bearing shells should be suspended above the bottom. Applicant has found that with the suspension method, it is also desirable to provide the growing oysters with uniform and optimum growing space. By using the suspension method and a novel spacing means, applicant has been able to promote rapid and large growth in the spats in a comparatively short time.

Figure 5:
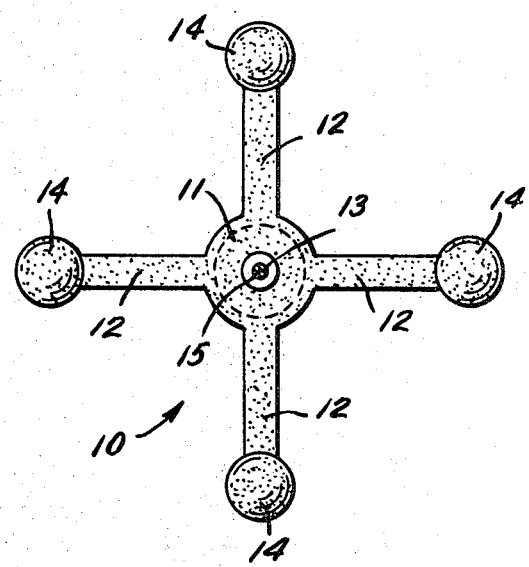
FIG. 5 is a section taken on line 5-5 on FIG. 4.
Figure 6:
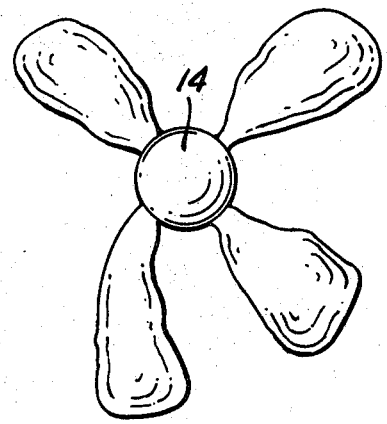
FIG. 6 is a plan view showing the growth of the oysters on the spat holder.

The selective spacing of the growing spats begins at the first point of contact. Instead of a haphazard collection on a scallop shell, applicant prefers to use the construction shown in FIGS. 4, 5 and 6. Referring to the figures, I provide a spider form 10 consisting of a central hub 11 and four evenly spaced arms 12. The hub 11 is provided with a central opening 13 for assembly purposes. The spider member 10 may be of any suitable rigid material such as a plastic. In accordance with the present invention, the spider 10 is coated with a conventional oyster repelling substance. Such substances are well-known on the market, comprising various salves and greases.

The spats are to be positioned at the end of the arms 12, and for this purpose I provide a spat holding member 14 mounted at the end of each arm 12. The spat holders 14 may be of any convenient shape and are illustrated as small spheres. It is desirable that the spat holders 14 be made of a calcium carbonate concentrate or coated therewith, since they replace the scallop shells which are preferred by the spats and promote their growth. The holders 14 may be mounted at the ends of the arms 12 in any conventional manner, with threads, adhesives, or any other means. A replaceable connection is preferable since it permits the removal of the holder and the grown oysters and a ready replacement with a new holder.

In accordance with the present invention, I mount the spat holder 10 on strings for suspension in the water. The construction of the spiders separates the spat holders 14, and the novel stringing provides further separation. Viewing FIG. 4, I provide a string 15 in the form of a length of wire of approximately 10 gauge with the bottom end 16 bent upwardly to hold the assembly. A comfortable handling length is 30 inches and by mounting the spiders 10 about 4½ inches apart, seven spiders can be mounted on each string. To provide the spacing, I provide plastic tubing 17, cut to the desired length, and slipped over the wire string 15 between the spiders 10.

Since the spacers 17 are not much greater in diameter than the central openings 13 in the spiders 10, the vertical movements of the tide and waves cause frictional wear which enlarges the openings and causes the spiders to slide down over each other. To prevent this, I use a cushion member 18 under each spider in the form of a small piece of fiberboard or similar water impervious substance which acts as a washer support and absorbs the friction.

Figure 4:
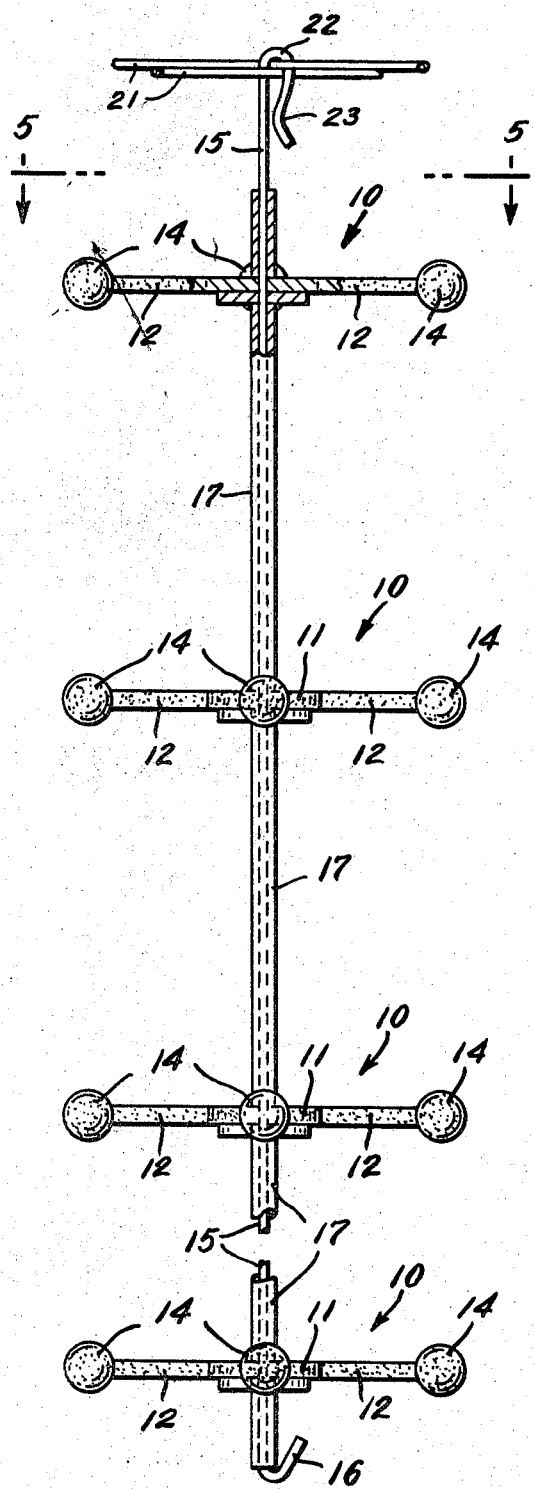
FIG. 4 is a side elevation, partly in section, showing one of the strings of spiders.

I now provide a float 19, such as illustrated in FIG. 1, for suspending the strings shown in FIG. 4. The floats 19 can be of any desired construction. I have illustrated a wooden frame 20 in the form of an inverted housing in which styrofoam billets may be positioned for buoyancy. The frame may have suitable cross members (not shown) for rigidity, if desired. The floats 19 are provided with wire mesh 21 in approximately 10 gauge wire in a 12 inches by 12 inches mesh.

Now referring again to FIG. 4, the top end of each string is reentrantly bent at 22 and then curved upwardly at 23 to form a spring clip. The strings are hung at the intersections of the wires, the spring clip snapping over the intersected wires 21 to form a snap or safety lock. The arms 12 of the spiders 10 are 3 inches to 4 inches in length. Since the strings are suspended from the wire intersections at 12 inches intervals, there is a minimum of at least 4 inches between adjacent spiders on adjacent strings. Thus each spat is provided with a cube of space surrounding it on all sides, and the cubes of spaces are uniform for all the spats. There is thus a uniform flow of water borne nutrients to each spat.

The floats 19 are preferably joined together to form a large raft in a suitable location. I therefore provide each float 19 with a connecting member 24, see FIG. 2. These members comprise flat strap portions 25 having angularly disposed vertical ears 26 at each end. Each member 24 is mounted across a corner of a float 19, the mounting being effected through suitable openings 27 in the strap 25, and openings 28 in the ears 26. An opening 29 is provided adjacent the upper end of each ear 26. Now when four floats 19 are brought together as shown in FIG. 3, the corners nest with the ears 26 in alignment. Also, the openings 29 of each ear 26 are in alignment. A bolt 30 can be passed through adjacent openings to lock the ears to each other. Thus a large raft is formed of a plurality of floats.

By using the suspension method, the spats are spaced from the bottom and the percentage of loss from predators is extremely small. Rapid and large growth is promoted by the use of applicant's novel construction and method which provides each spat with a uniform cubic space surrounding it. Not only is it given room to grow, but it receives its uniform share of the water borne nutrients.

While I have described the use of a calcium carbonate concentrate for the growing surface to replace the scallop shells, any other equivalent surface can be used. For example, a ceramic surface is also suitable for this purpose.

Other advantages of the present invention will be readily apparent to a person skilled in the art.

I claim:

1. An apparatus for growing oysters comprising a cultch holding member having a coating of an oyster spat-repelling substance, a plurality of oyster-growing surfaces mounted in spaced relation on said member, means for retaining a plurality of said members in vertical spaced relation and means for suspending said retaining means below the surface of the water for growing the oysters.

2. An apparatus as in claim 1, wherein said holding cultch member comprises a spider with radially extending arms, said arms being coated with an oyster spat repellant and an oyster spat growing area mounted at the end of each of said arms.

3. An apparatus as in claim 1, wherein said oyster-growing surfaces comprise calcium carbonate.

4. An apparatus as in claim 2, wherein said growing areas are provided with calcium carbonate surfaces.

5. An apparatus as in claim 1, wherein said retaining means comprises a length of stiff wire, a plurality of said holding members being mounted in vertical spaced relation on said wire, and a tubular spacing member on said wire between said members to retain said members in spaced relation.

6. An apparatus as in claim 2, wherein said retaining means comprises a length of stiff wire, a plurality of said holding members being mounted in vertical spaced relation on said wire, and a tubular spacing member on said wire between said members to retain said members in spaced relation.

7. An apparatus as in claim 4, wherein said retaining means comprises a length of stiff wire, a plurality of said holding members being mounted in vet vertical spaced relation on said wire, and a tubular spacing member on said wire between said members to retain said members in spaced relation.

8. An apparatus as in claim 5, wherein the upper end of said wire is reentrantly bent to form a safety clip for mounting said wire.

9. An apparatus as in claim 6, wherein the upper end of said wire is reentrantly bent to form a safety clip for mounting said wire.

10. An apparatus as in claim 1, wherein said suspending means comprises a floating frame having an open wire mesh, said retaining means being suspended at the intersections of the wires in said wire mesh.

11. An apparatus as in claim 8, wherein said suspending means comprises a floating frame having an open wire mesh, said safety clips being snapped over the intersections of the wires in said wire mesh to suspend said retaining means one at each intersection.

12. An apparatus as in claim 10, wherein said frame is provided at each corner with a connecting member whereby a plurality of said frames can be connected at their corners to form a large floating raft.

13. The method of growing oysters comprising the steps of coating a cultch or holding member with an oyster spat repellent, mounting an uncoated oyster spat-growing area in spaced relation at the outer portion of said holding member, mounting a plurality of said holding members in vertical spaced relation, and suspending a plurality of said mounted members in spaced relation beneath the surface of the water.

14. The method as in claim 13, wherein said holding member has spaced arms, said arms being coated with said repellent and a growing area is mounted at the end of each arm.

15. The method as in claim 14, wherein said growing area is coated with calcium carbonate.